US007139455B1

(12) United States Patent
Gunn, III et al.

(10) Patent No.: US 7,139,455 B1
(45) Date of Patent: Nov. 21, 2006

(54) ELECTRONICALLY CONTROLLABLE ARRAYED WAVEGUIDE GRATINGS

(75) Inventors: Lawrence C. Gunn, III, Encinitas, CA (US); Thierry J. Pinguet, Cardif-By-The-Sea, CA (US); Maxime J. Rattier, Paris (FR); Jeremy Witzens, Pasadena, CA (US)

(73) Assignee: Luxtera, Carlsbad, CA (US)

( * ) Notice: Subject to any disclaimer, the term of this patent is extended or adjusted under 35 U.S.C. 154(b) by 211 days.

(21) Appl. No.: 10/803,747

(22) Filed: Mar. 17, 2004

Related U.S. Application Data

(60) Provisional application No. 60/455,910, filed on Mar. 18, 2003.

(51) Int. Cl.

| | |
|---|---|
| ***G02B 6/34*** | (2006.01) |
| ***G02B 6/12*** | (2006.01) |
| ***G02B 6/10*** | (2006.01) |

(52) U.S. Cl. .......................... 385/37; 385/14; 385/129; 385/130

(58) Field of Classification Search ................. 385/37, 385/14, 129, 130

See application file for complete search history.

(56) References Cited

U.S. PATENT DOCUMENTS

| | | | | |
|---|---|---|---|---|
| 5,617,234 | A * | 4/1997 | Koga et al. | 398/14 |
| 6,233,070 | B1 * | 5/2001 | Lu et al. | 359/9 |
| 2004/0033004 | A1 * | 2/2004 | Welch et al. | 385/14 |
| 2004/0037500 | A1 * | 2/2004 | Yoo | 385/31 |
| 2004/0248381 | A1 * | 12/2004 | Myrick | 438/460 |
| 2005/0065012 | A1 * | 3/2005 | Rosenflanz et al. | 501/41 |

OTHER PUBLICATIONS

Yamada, Hiroaki et al., "Crosstalk Reduction in a IO-GHZ Spacing Arrayed-Waveguide Grating by Phase-Error Compensation",□□Mar. 1998, Journal of Lightwave Technology, vol. 16, No. 3, pp. 364-371.*

* cited by examiner

*Primary Examiner*—Brian Healy
*Assistant Examiner*—Jerry Martin Blevins
(74) *Attorney, Agent, or Firm*—Fernandez&Associates,LLP

(57) ABSTRACT

Electronically controllable arrayed waveguide gratings (AWGs) with integrated phase error compensation for each individual arm of the array of waveguides. These AWGs and associated methods for static and dynamic phase compensation enable the fabrication of tunable AWGs which can track one or more drifting channels of an AWG.

15 Claims, 8 Drawing Sheets

ELECTRONICALLY CONTROLLABLE ARRAYED WAVEGUIDE GRATINGS

CROSS-REFERENCE TO RELATED APPLICATIONS

This application claims priority from U.S. Provisional application No. 60/455,910 filed Mar. 18, 2003.

FIELD OF THE INVENTION

The present invention relates to arrayed waveguide gratings (AWG) for use in wavelength division multiplexing (WDM) optical communications networks.

BACKGROUND OF THE INVENTION

Arrayed waveguide gratings (AWG) have recently found wide scale use in optical networks with the introduction of wavelength division multiplexing (WDM) as a means for increasing the available bandwidth for optical communications. AWGs multiplex and demultiplex multiple channels, each carried on a different wavelength into/out of a single waveguide or fiber, and can also be used in router, add-drop and switch configurations.

An AWG is very similar to well known bulk diffraction gratings except that it is a planar device, in which the waveguides of the array act as the grates of the grating. The imaging properties of an Awg are determined by a few parameters, including the lengths of the arrayed waveguides and their effective indices, resulting in phase relationships between the fields propagating in them. Any imperfection introduced during the fabrication of an AWG, such as a variation in waveguide dimensions along their length or changes in material composition will adversely affect the performance of the AWG. For example, random variations due to the fabrication process create deviations from the ideal phase needed at the far end of the waveguides and cause what can be called "phase errors."

Most commercial AWGs are fabricated in silica on silicon, with the waveguides having large dimensions to match the modes of a fiber. These AWGs are relatively unaffected by the fabrication problems mentioned above because any fluctuations in waveguide dimensions are small compared to their size, and improved processes have helped control the uniformity of the materials composing the waveguides. However most silica AWGs use temperature control of the whole chip, to make sure they match standard channels like the ITU grid. Such temperature controlled chips are very expensive.

Recent advances in the use of standard CMOS processes for the fabrication of optoelectronic integrated circuits promises to dramatically reduce the size and cost of devices like AWGs. However, as the sizes of integrated circuits and waveguides are reduced, they become much more sensitive to fabrication issues.

SUMMARY OF THE INVENTION

Electronically controllable arrayed waveguide gratings (AWGs) with integrated phase error compensation for each individual arm of the array of waveguides. These AWGs and associated methods for static and dynamic phase compensation enable the fabrication of tunable AWGs which can track one or more drifting channels of an AWG.

DETAILED DESCRIPTION

Figure 1:
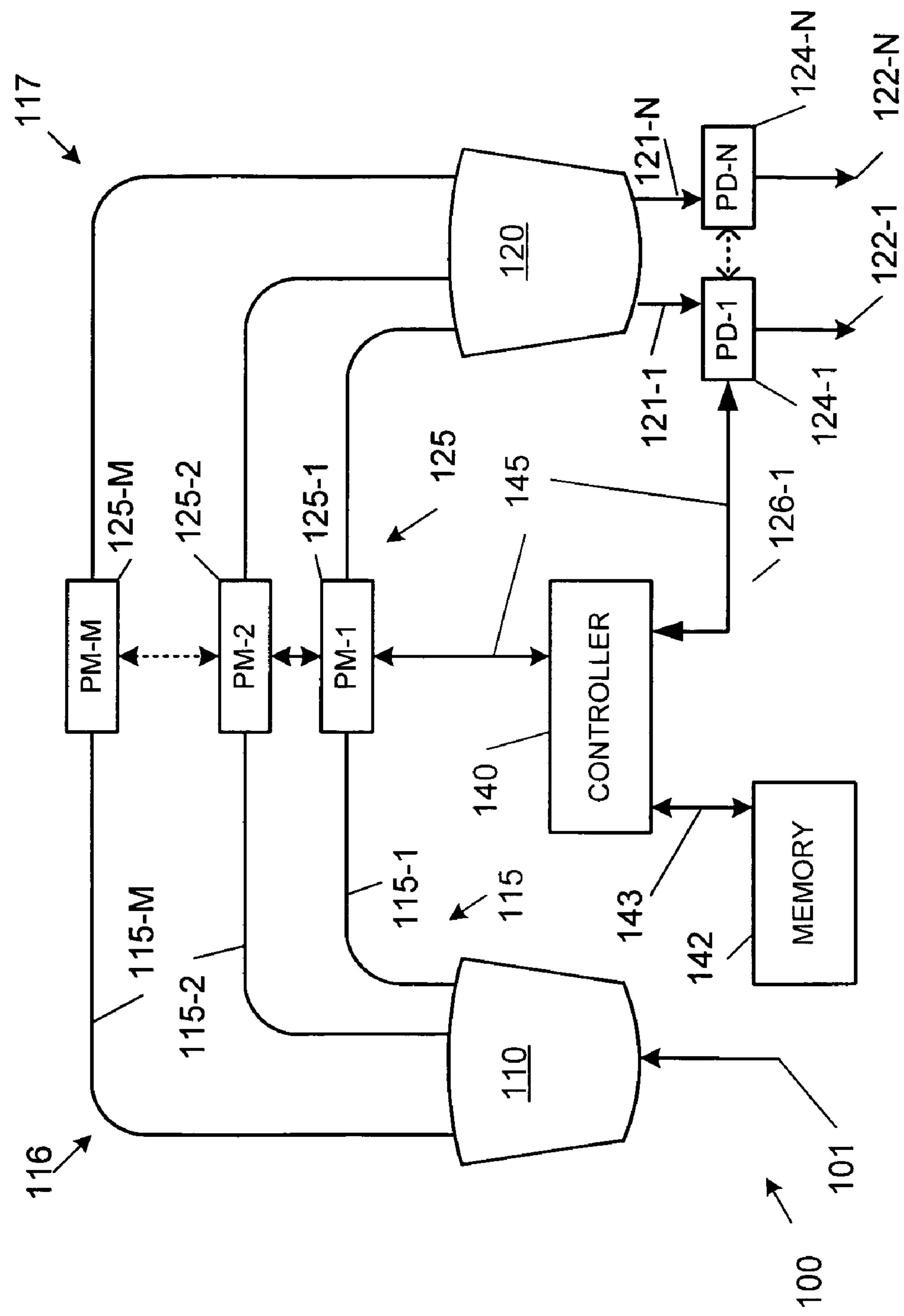
FIG. 1 is a diagram of an integrated electronically controllable arrayed waveguide grating, with adjustable phase modulators according to one embodiment of the present invention.

FIG. 1 is a diagram of an integrated electronically controllable arrayed waveguide grating (AWG), configures as a demultiplexer, with adjustable phase modulators, according to one embodiment of the present invention. AWG 100 has optical input 101 and optical outputs 122. AWG 100 includes input slab 110, arrayed waveguides 115, photodetectors 124, phase modulators 125 and output slab 120. There are M arrayed waveguides 115 connected between input slab 110 and output slab 120. There can be many, as in dozens or even hundreds of arrayed waveguides 115, such as 115-1, 115-2 and 115-M in an AWG. Only three are shown in FIG. 1 to simplify the diagram. The number of arrayed waveguides 115 is dependent on the specific design and application of the AWG. AWG 100 is a demultiplexer with a multiplexed input 101 and demultiplexed outputs 122-1 to 122-N, where N is the number of channels processed by AWG 100.

Controller 140 is connected to bus 145, which operates as a control and data bus communicating with photodetectors 124 and phase modulators 125. Controller 140 is connected to memory system 142 by connection 143. Memory 142 can include volatile memory such as RAM and non-volatile memory such as EPROM. Each output channel 121-1 to 121-N is monitored by respective photodetectors 124-1 to 124-N. Each photodetector 124 generates an electrical output signal in response to detected light and the output of each photodetector is sent as data on bus 145 to controller 140. Each of the arrayed waveguides 115 includes a respective phase modulator 125-1 to 125-M in its optical path. Controller 140 sends control signals to each phase modulator 125 via bus 145. Controller 140 can store and retrieve phase modulator settings in memory 142.

AWG 100 can be fabricated on a variety of substrates, such as silicon, silicon on insulator (SOI), silicon on sapphire (SOS), silicon on nothing (SON) and a five layer substrate made of three layers of silicon with intermediate layers of insulator such as silicon dioxide. These substrates are particularly suitable for use in standard CMOS fabrication production lines.

Since light 101 is the input to AWG 100, many of the elements of AWG 100, such as 101, 115, 121 and 122 are optical waveguides. The waveguides of AWG 100 can be fabricated of a variety of types of waveguides, including a strip loaded waveguide, a channel waveguide, a rib waveguide and a ridge waveguide. The strip loaded waveguide can be made of a strip, a slab and a low index transition layer between the strip and the slab.

Phase modulators 125 can be made of active devices such as a transistor or a PIN diode or a passive device such as a resistor. Phase modulators 125 provide a way to control the effective index of a waveguide by an optoelectronic method which is faster than the thermal time constant of the materials used to make the AWG. Embodiments of this technique include carrier extraction and injection in semiconductor waveguides that also form transistors or diodes, the electrooptic effect, and effects in quantum well and quantum dot devices, such as the quantum confined Stark effect. Typical material systems include bulk silicon, silicon on insulator (SOI), III–V semiconductors like InGaAlAs on InP, and $LiNbO_3$, which is used extensively in modulators.

Some examples of modulators are discussed in U.S. patent applications Ser. No. 10/650,234 entitled "Active Waveguides for Optoelectronic Devices" filed on Aug. 27, 2003 and Ser. No. 10/606,297 entitled "Integrated optical and electronic devices" filed on Jun. 24, 2003, and incorporated herein by reference.

AWG 100 in FIG. 1 is a 1×N demultiplexer, and the various embodiments of the present invention can be implemented in other types of AWGs, such as N×1 multiplexers and N×N routers.

As a 1×N demultiplexer, the input 101 to AWG 100 is a multiplexed stream of light of several different frequencies. Each of these frequencies or wavelengths can be considered as separate channels used to send information or data. AWG 100 separates the multiplexed input 101 it receives into the original multiple frequencies, each of which is output on a separate output 122-1, etc., and which can be further processed as needed.

Light within input slab 110 is in a Free Propagation Region (FPR) and is divergent with a circularly cylindrical phasefront. The divergent beam is coupled to the array of waveguides 115 and propagates to the output slab 120, which is also a Free Propagation Region, where the multiple outputs of the array of waveguides form multiple beams. The convergent beams constructively and destructively interfere to direct each wavelength of a channel of light to one of the outputs of output slab 120. The length of each waveguide of the array of waveguides 115 is chosen so that the optical path length difference between adjacent waveguides is an integer multiple of the central wavelength of AWG 100. The general principles of operation of arrayed waveguide gratings are well known to those skilled in the art, and need not be elaborated upon in this discussion.

The light propagating in each of the arms of the array of waveguides 115 is subject to a certain amount of phase error from a variety of sources, such as variations in fabrication and changes in operating temperature and other factors.

Inserting phase modulators 125, into each of the arms of the array of waveguides 115, enables AWG 100 to have static and dynamic phase error correction of the light propagating in each of the arms of the array of waveguides and such error correction can dramatically reduce crosstalk between the communications channels and improve the overall performance of AWG 100. The phase modulators 125 and associated control system can also be used to make a tunable AWG, which can track one or more channels that are drifting from their frequency bands.

The general principle of operation of AWG 100 is to align one or a set of output channels to a set of frequencies, by optimizing the power output on one or a set of photodetectors 124. The channels can be aligned to a standard set of channels, such as an ITU (International Telecommunications Union) grid. The control system and the AWG can all be integrated on the same substrate.

A particularly advantageous aspect of the present invention is that static and dynamic phase compensation can be used to minimize phase errors in the arrayed waveguides 115 due to fabrication problems, or to tune AWG channel peak wavelengths in response to varying ambient temperature conditions and even frequency drift on any of the inputs to the channels of an AWG.

Dynamic phase compensation can be used to minimize any phase errors introduced into each of the arms of arrayed waveguides 115 during the fabrication process. Such fabrication errors are very likely if nanophotonic scale waveguides of less than one micron in cross sectional dimensions are made on a silicon or SOI substrate, especially during a standard CMOS process.

Dynamic phase compensation can be used to minimize phase errors that occur during the operation of the AWG by running a phase compensation algorithm in the control system of the AWG continuously during operation.

A particularly advantageous aspect of the present invention is that tuning of each of the channels of the AWG can be performed during operation of the AWG, if a decline in power output at one of the photodetectors has been detected or if some drift in the input frequency to an AWG channel has been detected. Tuning can be accomplished by adjusting one or more of the phase modulators 125 to tilt the phase front of the converging beams in the output slab 120 to the correct output of the output slab 120.

Arrayed waveguides 115 include curved sections 116 and 117 where each of the curved sections 116 have the same shape defined by the same radius of curvature and the same length in each of the waveguides 115. Similarly, each of the curved sections 117 have the same shape as defined by the same radius of curvature and the same length in each of the waveguides 115.

One advantageous aspect of the present invention is the design of the arrayed waveguides 115, where each curved section 116 and 117 has the same length and shape and the majority of the length of each of the array of waveguides 115 is made of straight sections oriented parallel to the x and y axes of an integrated circuit.

The sources of phase errors in typical AWGs are imperfect lithography and etching and variations in the thickness of films over the area covered by the device. Standard electronic processes and layout rules are never optimized for curved geometries, which are needed to make waveguide bends. For example, without careful calibration, a waveguide propagating in the x direction will have a different width than a waveguide propagating in the y direction, even though they were drawn with the same width. A typical AWG where the array of waveguides all have different radii of curvature will have degraded performance due to this fabrication problem.

One way to reduce the effect of a lack of curved geometries is to minimize the use of curved geometries as in the configuration shown in FIG. 1, where most of the length of the arrayed waveguides is along the x and y axes. There are some curved sections at the slab/array interfaces and two quarter turn bends. These quarter turn bends are identical in each of the array of waveguides, so their total contribution to waveguide phase error will be the same for all the waveguides and this can greatly simplify the process of phase error correction as discussed previously with regard to AWGs of the present invention.

Another advantage of the straight sections of the array of waveguides 115 is that having the straight sections simplifies the fabrication of identical phase modulators 125 in the waveguides 115.

Figure 2:
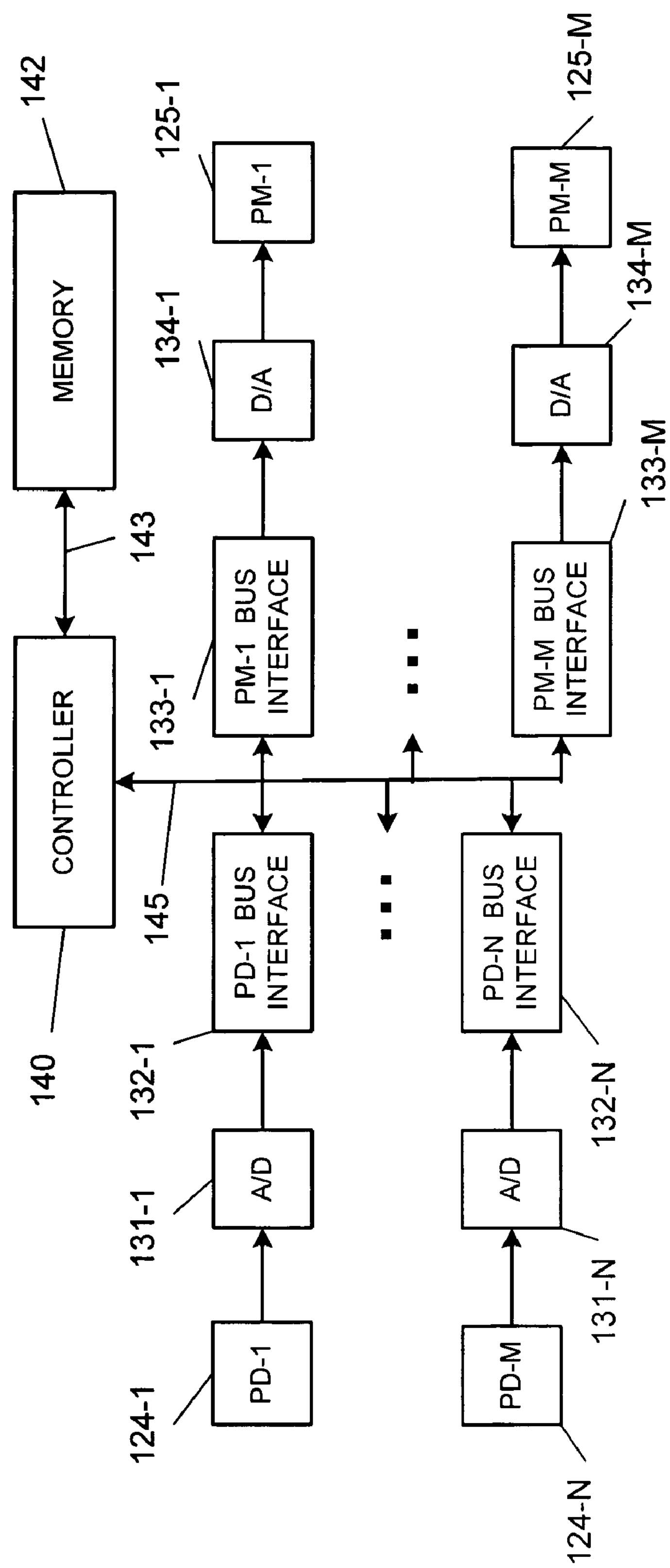
FIG. 2 is a block diagram of a system for controlling the operation of an arrayed waveguide grating, according to one embodiment of the present invention.

FIG. 2 is a block diagram of a system for controlling the operation of an AWG, according to one embodiment of the present invention. Controller 140 is connected to memory system 142 via bus 143 for the storage and retrieval of phase modulator settings.

Controller 140 uses bus 145 for control and data communications with photodetectors 124 and phase modulators 125.

The output of photodetector 124-1 is converted from an analog signal to digital data by A/D converter 131-1, which sends the digital data to photodetector bus interface 132-1. Bus interface 132-1 sends the data to controller 140 via bus 145. Each of the N photodetectors of AWG 100 has a similar circuit and FIG. 2 shows these systems for the first (124-1) and the last (124-N) photodetectors.

Controller 140 is connected to phase modulator bus interface 133-1 by bus 145. Phase modulator bus interface 133-1 sends the digital data to D/A converter 134-1, which sends the analog signal to phase modulator 125-1. The analog signal sent to a phase modulator by controller 140 will change the amount of phase modulation introduced into the optical path of the respective one of the array of waveguides 115. Each of the M phase modulators of AWG 100 has a similar system and FIG. 2 shows these systems for the first (125-1) and the last (125-M) phase modulators.

Figure 3:
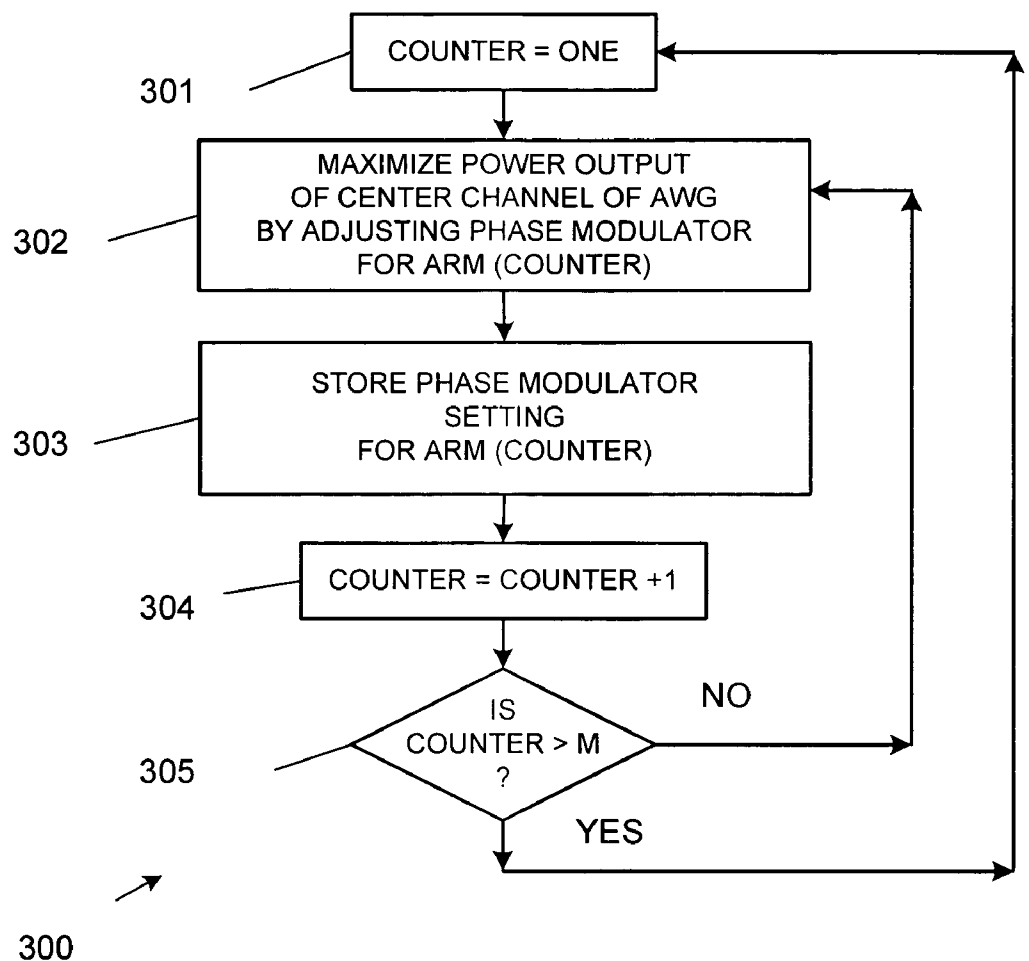
FIG. 3 is a block diagram of a process for dynamic phase compensation of an arrayed waveguide grating, according to one embodiment of the present invention.

FIG. 3 is a block diagram of a process for dynamic phase compensation of an arrayed waveguide grating during its operation, according to one embodiment of the present invention. As the operating temperature of an AWG changes, the effective index of the waveguide changes, resulting in a drift of the peak wavelength of the transfer function for each channel of the AWG.

In block 301, the variable COUNTER is set to one. COUNTER stores the number of the arm of the arrayed waveguide 115 that is going to be adjusted if necessary. Flow proceeds to block 302.

In block 302, the power output level of the center channel is monitored using the photodetector 124 for the center channel and the control system will adjust the phase modulator for the arm specified by the variable COUNTER, in order to maximize the power output level of the center channel. Flow proceeds to block 303.

In block 303, the phase modulator setting for the current arm specified by the variable COUNTER is stored in memory 142. Memory 142 can contain a lookup table, such that for any arm in the array 115, controller 140 will be able to retrieve the phase modulator settings for all the arms of the arrayed waveguides in order to maximize the power output level of the center channel. From block 303, flow proceeds to block 304.

In block 304, the variable COUNTER is incremented by one, which means the next arm in the arrayed waveguides 115 of the AWG is to be considered by the process. Flow proceeds to block 305.

In block 305, the variable COUNTER is tested to determine if it is greater than M, where M is the number of arms in the arrayed waveguides 115. If COUNTER is less than or equal to M, then flow returns to block 302. If COUNTER is greater than M. then flow proceeds to block 306, which means all the arms of the array 115 have been adjusted, as needed and the process can run continuously so that flow returns to block 301.

This method allows the wavelength response of the AWG channels to be unchanged even when ambient temperature changes or other variations of environment occur.

Figure 4:
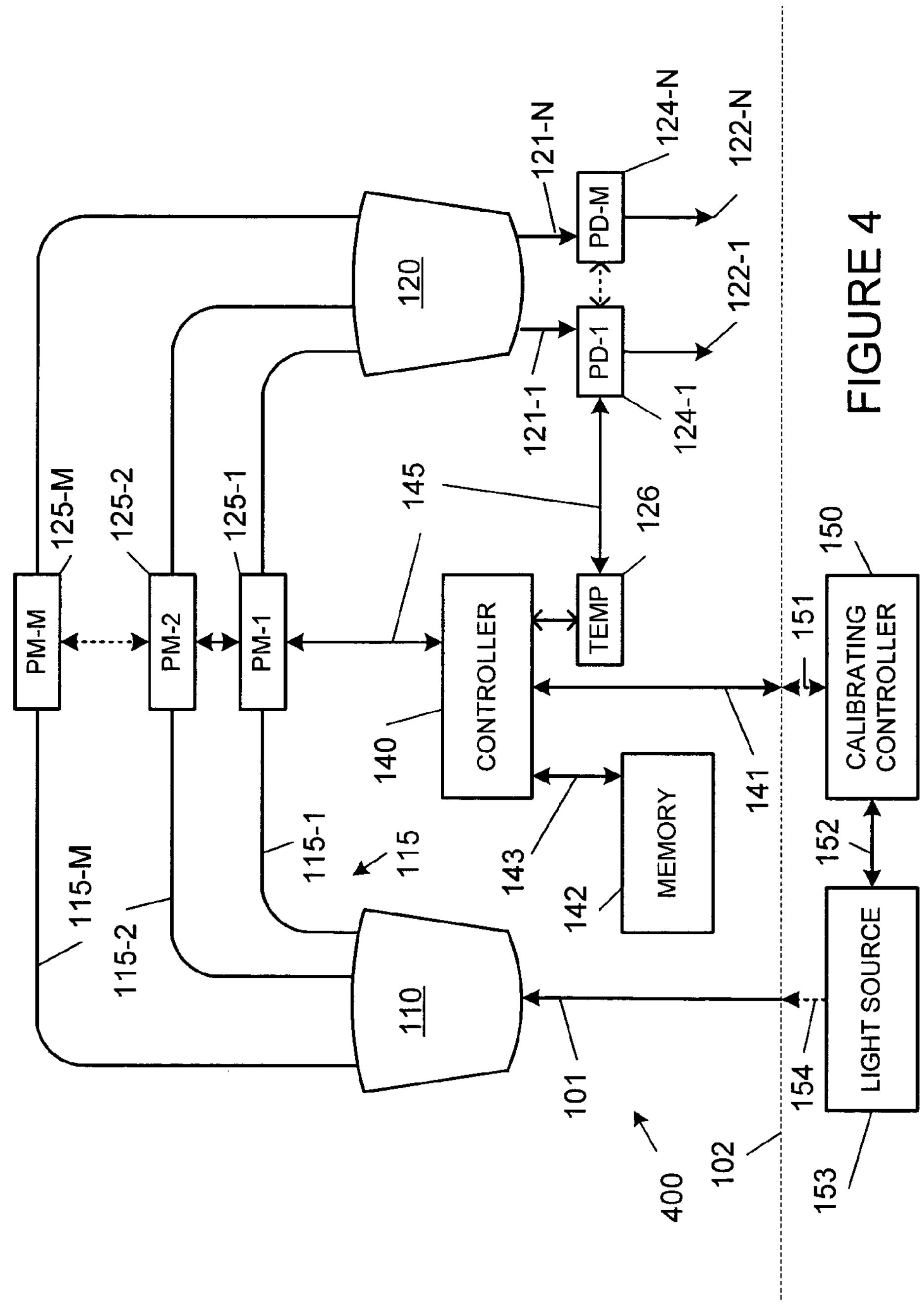
FIG. 4 is a diagram of an integrated electronically controllable arrayed waveguide grating, with adjustable phase modulators, according to another embodiment of the present invention.

FIG. 4 is a diagram of an integrated electronically controllable arrayed waveguide grating (AWG), configures as a demultiplexer, with adjustable phase modulators, according to one embodiment of the present invention. AWG 400 has optical input 101 and optical outputs 122. AWG 100 includes input slab 110, arrayed waveguides 115, photodetectors 124, phase modulators 125, temperature sensor 124 and output slab 120. There are M arrayed waveguides 115 connected between input slab 110 and output slab 120. The similarly numbered elements of AWG 400 and AWG 100 of FIG. 1 are similar in function and operation.

In FIG. 4, AWG 400 is integrated on a substrate and is connected to external systems. These external systems are shown below dashed line 102, but in alternate embodiments of the present invention, these systems can be on the same integrated circuit as AWG 400. Calibrating controller 150 is connected by bus 151 to bus 141 of controller 140. Calibrating controller 150 controls the operation and frequency of light source 153 by control line 152. In certain calibration procedures, which can be conducted in a production or laboratory test facility, the output 154 of light source 153 can be connected to the input 101 of AWG 400.

Temperature sensor 126 is in close proximity to the array of waveguides 115 and is connected to controller 140 via bus 145. Temperature sensor 126 can be connected to bus 145 in a manner similar to the way that each photodetector 124 is connected to bus 145, as shown in FIG. 2. The output of temperature sensor 126 is converted from an analog signal to digital data by an A/D converter, which sends the digital data to a temperature sensor bus interface. The bus interface sends the data to controller 140 via bus 145.

Static phase compensation can be used to minimize any phase errors introduced into each of the arms of arrayed waveguides 115 during the fabrication process. Such fabrication errors are very likely if nanophotonic scale waveguides of less than one micron in cross sectional dimensions are made on a silicon or SOI substrate, especially during a standard CMOS process. Static phase compensation can be performed at the foundry or during the chip packaging process and the adjustments needed to minimize phase errors can be stored in memory system 142. Temperature stabilization of AWG 400 can be performed during the power up of the AWG or periodically during the operation of the AWG as part of an alignment cycle.

In other embodiments of the present invention, there can be multiple temperature sensors 126 positioned within and around an AWG. In other embodiments, there can be one or more heating elements located within and around an AWG, which can be used to maintain a stable operating temperature, if the ambient temperature tends to vary. Heating an AWG can be used as part of an overall phase compensation system.

Figure 5:
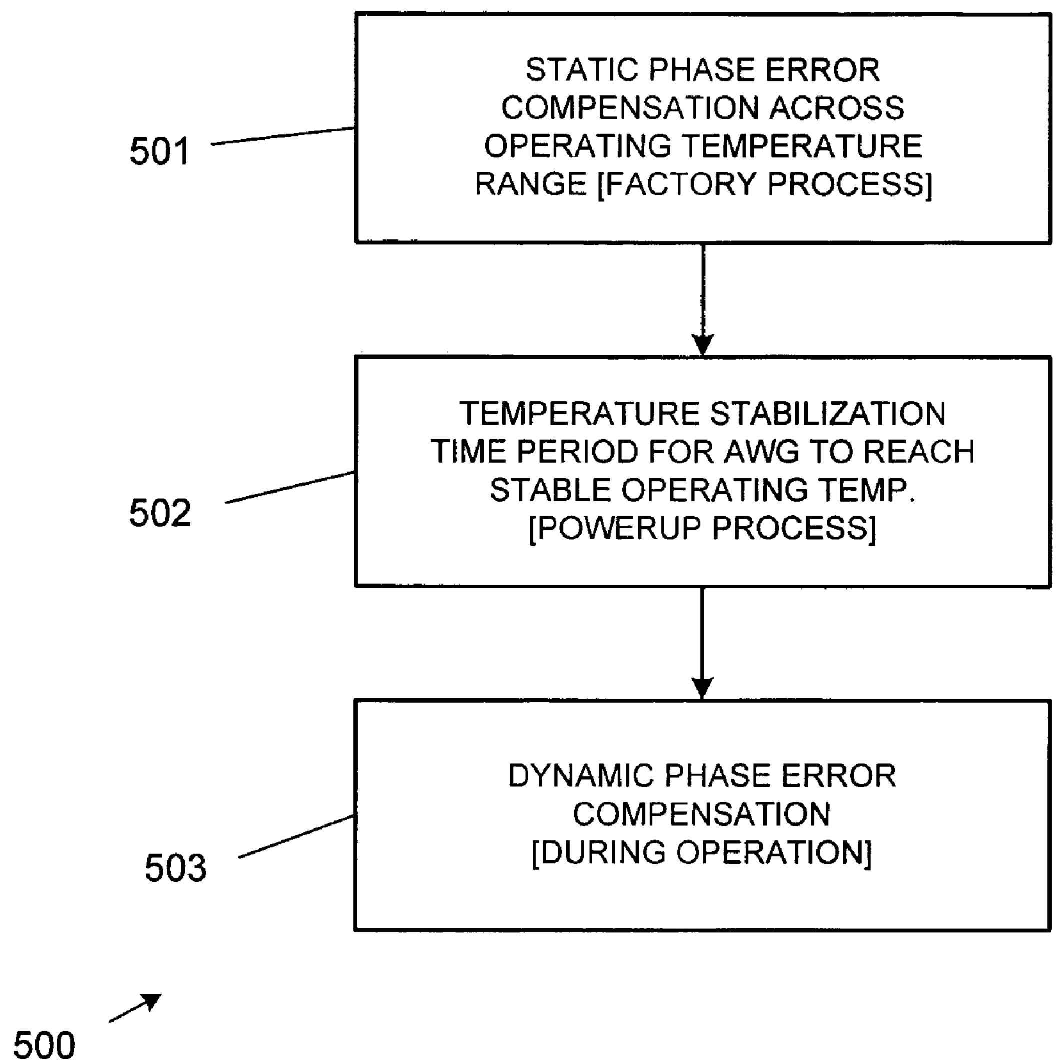
FIG. 5 is a block diagram of processes for adjusting the operation of an arrayed waveguide grating, according to one embodiment of the present invention.

FIG. 5 is a block diagram of processes for adjusting the operation of an arrayed waveguide grating, according to another embodiment of the present invention. As the operating temperature of an AWG changes, the amount of phase compensation in each arm will also be changing, because the dispersion of the waveguides of the array changes.

Block 501 is a process for static phase error compensation of exemplary AWG 400 of the present invention, across the operating temperature range of the AWG. Process 501 is shown in more detail in FIG. 6. Process 501 can be performed in a production or laboratory test setup. AWG 400 on a chip is connected to the external systems calibrating controller 150 and light source 153 and placed in a temperature controlled environment. As the temperature is varied across a specified operating temperature range, the phase modulators are adjusted to provide for the maximum power output level of the center channel of the AWG at each desired temperature setpoint within the operating temperature range. The settings of the phase modulators for each temperature setpoint as determined by this process are stored in the non-volatile memory 142 of the AWG 400, so that these settings can be used to establish a baseline of operation for optimum performance at any given temperature in the operating range.

Block 502 is a process during the powerup of AWG 400 for stabilizing the operating temperature of the AWG. This process can take some period of time as determined by the temperature stability of the ambient environment. As soon as the temperature of the AWG has stabilized within some acceptable range of tolerance, then the appropriate phase modulator settings for the AWG stored during process 501 can be retrieved from memory 142 and the AWG can go into operation.

Block 503 is a process for dynamic phase compensation of AWG 400 during its operation. This process was shown in FIG. 3 as process 300 with regard to AWG 100 and is essentially the same process for AWG 400. Photodetector 124 monitors the power output level of the center channel of AWG 400. Controller 140 can alter the appropriate phase modulator settings to maximize the power level of the center channel.

The method of block 503 can be used to span the phase modulator settings between two of the factory temperature settings recorded in memory, thus allowing for a coarser temperature calibration at the factory.

Figure 6:
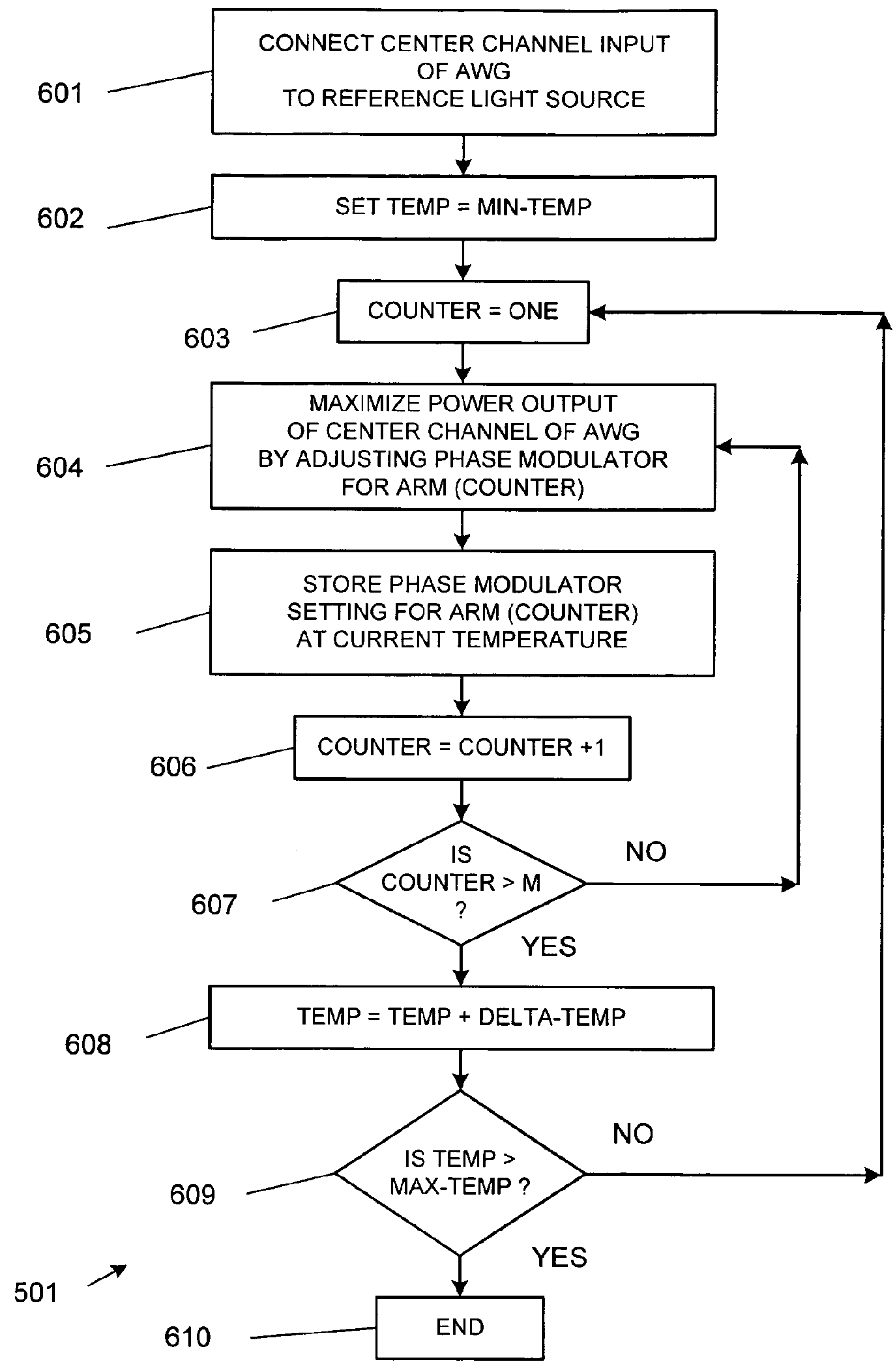
FIG. 6 is a block diagram of a process for providing an integrated arrayed waveguide grating with static phase error compensation, according to one embodiment of the present invention.

FIG. 6 is a block diagram of process 501 for providing an integrated arrayed waveguide grating 400 with static phase error compensation, according to one embodiment of the present invention. The overall process of static phase error compensation as summarized in block 501 of FIG. 5. Process 501 can be performed by controller 140 on the same chip as AWG 400 or it can be controlled by an external controller, such as calibrating controller 150 in FIG. 1.

Process 501, as shown in FIGS. 5 and 6 can be done on a production line or in a laboratory test process with AWG 400 in an environmental test chamber, where the temperature of the test chamber can be set by the controller performing the static phase error compensation process.

In block 601, the center channel input of AWG 400 is connected to a reference light source, such as 153 shown in FIG. 1. Light source 153 is a high quality, stable reference light source capable of producing each frequency of light which can be input into AWG 400. As mentioned previously, a typical AWG is designed for a given center frequency, with the other channels spaced above and below the center frequency with a fixed spacing between channels. A properly designed AWG can go through the process of static phase compensation by connecting the center channel input of the AWG to reference light source 153. Not every channel frequency that is capable of passing through an AWG has to be used as a test signal for static phase compensation, but can be if so desired.

From block 601, flow proceeds to block 602, where the variable TEMP is set to MIN-TEMP, the minimum operating temperature of AWG 400 and the test chamber is set to the temperature equal to TEMP.

From block 602, flow proceeds to block 603, where the variable COUNTER is set equal to one. COUNTER keeps track of which arm of the arrayed waveguides 115 is currently under test. Flow proceeds to block 604 from block 603.

In block 604, the power output level of the center channel is monitored using photodetector 124 for the center channel and the control system will adjust the phase modulator for the arm specified by the variable COUNTER, in order to maximize the power output level of the center channel. Flow proceeds to block 605.

In block 605, the phase modulator setting for the current value of TEMP and the arm tracked by the variable COUNTER is stored in memory 142. Memory 142 can contain a lookup table, such that for any operating temperature and for any arm in the array 115, controller 140 will be able to retrieve the phase modulator settings for all the arms of the arrayed waveguides in order to maximize the power output level of the center channel. From block 605, flow proceeds to block 606.

In block 606, the variable COUNTER is incremented by one, which means that the phase modulator for next arm in the arrayed waveguides 115 of the AWG may be adjusted by the process. Flow proceeds to block 607.

In block 607, the variable COUNTER is tested to determine if it is greater than M, where M is the number of arms in the arrayed waveguides 115. If COUNTER is less than or equal to M, then flow returns to block 603. If COUNTER is greater than M. then flow proceeds to block 608, which means all the arms of the array 115 have been adjusted at the current value of TEMP. Flow proceeds to block 608.

In block 609, the variable TEMP is increased by the value stored in DELTA-TEMP, which means that the temperature in the test chamber is being increased. The value of DELTA-TEMP was determined in prior lab tests to be the incremental change in temperature that can cause the power output level of the center channel of the AWG to be affected by such a temperature change. From block 609, flow proceeds to block 610.

In block 610, the variable TEMP is tested to determine if it is larger than MAX-TEMP, which is the maximum operating temperature of the AWG. If TEMP is less than or equal to MAX-TEMP, then flow proceeds back to block 603 and all the arms of the AWG can be adjusted for the new temperature setting made in block 609. If TEMP is greater than MAX-TEMP, then all the arms of the AWG have been adjusted for all the specified temperatures and flow proceeds to block 610 and the process ends.

In alternate embodiments, the process 600 can start with adjusting the phase modulator of the middle arm of the arrayed waveguides 115, and then proceed to adjust the phase modulators in the arms adjacent to and on either side of the middle arm.

Figure 7:
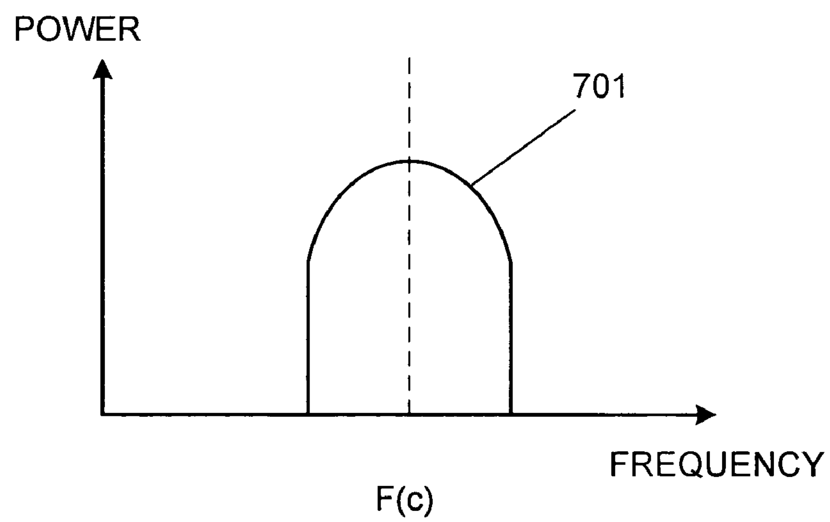
FIG. 7 is a diagram of the frequency spectrum of a communications channel of an arrayed waveguide grating with a Gaussian passband.

FIG. 7 is a diagram of the frequency spectrum 701 of a communications channel of a typical AWG with a Gaussian passband. The non-rectangular passband characteristic of a typical AWG will allow only a minimal tolerance to a shift in wavelength. Optical signals are typically passed through several AWG routers and filters in a WDM network, and the cumulative width of the passband becomes progressively narrower, with a resultant decrease in signal levels and an increase in crosstalk. A shaped or flattened passband for an AWG is highly desirable, but difficult to achieve with prior art methods.

Figure 8:
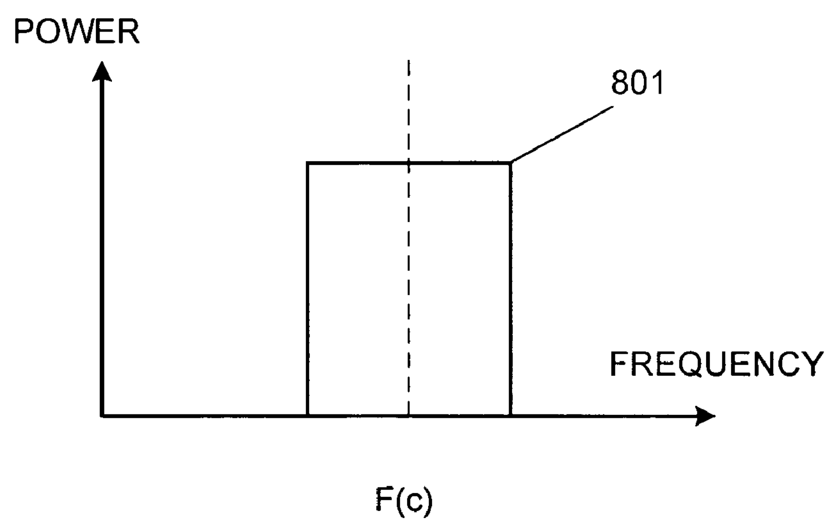
FIG. 8 is a diagram of the frequency spectrum of a communications channel of an arrayed waveguide grating with a flattened passband.

FIG. 8 is a diagram of the frequency spectrum 801 of a channel of an AWG with a flattened passband. An AWG 100 of the present invention can provide a shaped or flattened passband by selective adjustment of the phase modulators 125 of the array of waveguides 115. A flattened passband can, for example, be generated by using the (sin x)/x function or other mathematical functions.

Figure 9:
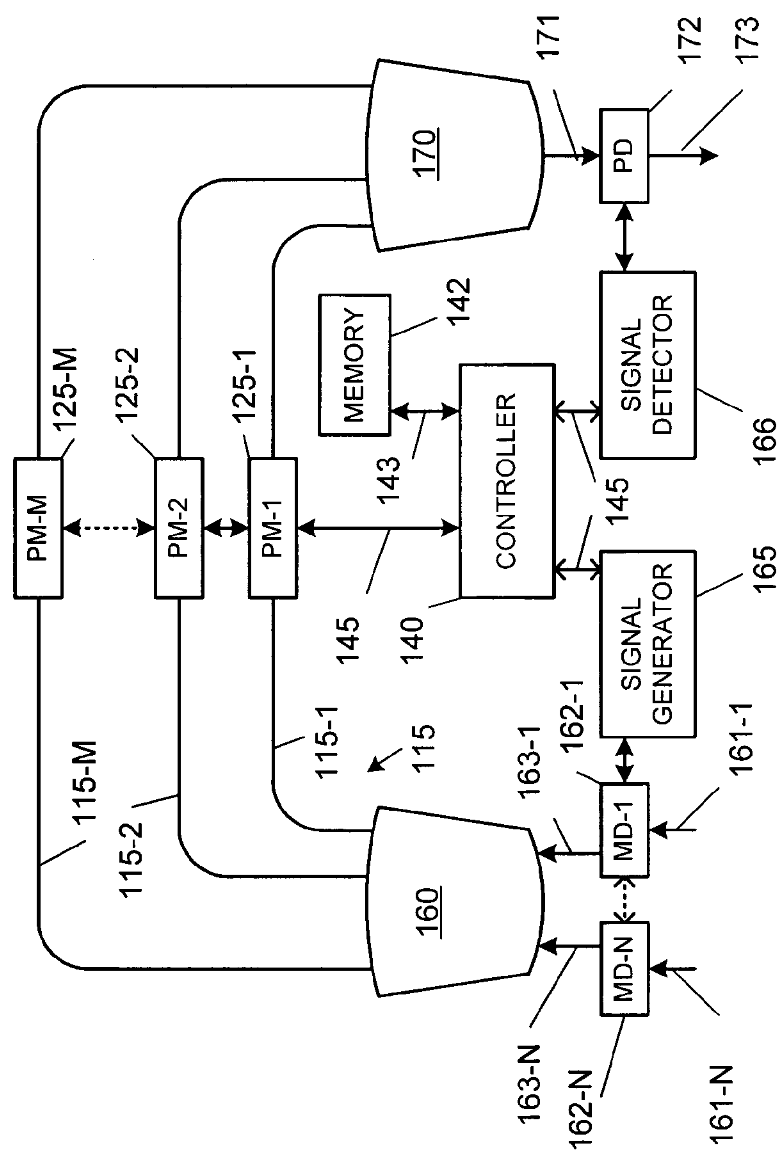
FIG. 9 is a diagram of an electronically controllable integrated arrayed waveguide grating, according to another embodiment of the present invention.

FIG. 9 is a diagram of an integrated electronically controllable arrayed waveguide grating configures as a multiplexer, according to another embodiment of the present invention. AWG 900 has optical inputs 161 and optical output 173. AWG 180 includes input slab 160, arrayed waveguides 115, modulators 162, photodetector 172, phase modulators 125 and output slab 170. There are M arrayed waveguides 115 connected between input slab 160 and output slab 170. The similarly numbered elements of FIGS. 1 and 9 are similar in function and operation.

Optical inputs 161-1 to 161-N are connected to respective optical modulators 162-1 to 162-N, which are connected to respective optical inputs 163-1 to 163-N, which are connected to input slab 160. Output slab 170 is connected to optical output line 171, which is connected to photodetector 172. Controller 140 is connected to signal generator 165, signal detector 166, modulators 162 and photodetector 172 by bus 145. Bus 145 sends control and data communications information to all of the sensors and devices on the bus.

Signal generator 165 can generate an electrical test signal or a pilot signal, which is much lower in frequency, such as in the MHz range, than the optical channel frequencies of AWG 900. The test signal can be modulated onto any of the input signals 161 by selecting one of the modulators 162. The selected channel modulated with a test signal will be multiplexed with the other input channels by AWG 900 and then be part of multiplexed output 173. Photodetector 172 monitors the output 171 of AWG 900 and the signal generated by the photodetector 172 is sent to signal detector 166, which can then detect the modulated test signal generated by signal generator 165 and modulated onto one of the input channels 161. The magnitude of the test signal detected by signal generator 166 will be representative of the power output level of the AWG channel on which the test signal was modulated.

Static and dynamic phase error compensation of AWG 900 can be accomplished by processes similar to those outlined in FIGS. 3, 5 and 6, but as applied to the architecture and operation of AWG 900. Phase error compensation can be performed by adjusting the phase modulators while modulating the center channel of the AWG.

In other embodiments of the present invention, where there may be very large amounts of phase error, the controller 140 of an AWG could tilt the multiple streams of light within an output slab, to the adjacent channels. The controller could also communicate this channel shifting to the other optoelectronic devices downstream of the AWG, so that the appropriate channels are connected to the correct destinations.

In other embodiments of the present invention, where there may be very large variations in the ambient temperature and the phase modulators do not provide enough phase change to compensate for the temperature drift, then the AWG can be designed such that the free spectral range of the AWG is small and comparable to the amount of tuning available with the phase modulator. In that situation, the controller 140 can automatically redirect the light signals to different physical locations than the original design of the AWG called for, since the reduced free spectral range of the AWG allows the spectrum of the channels to wrap around. This is possible within the tuning range allowed by the phase modulators. In some instances it would be equivalent to shifting the center frequency of the AWG (the frequency coming out of the central channel) by multiples of the channel spacing. Controller 140 can also communicate to the rest of the optoelectronic elements in the circuit this channel shift.

Although the present invention has been described in detail, it should be understood that various changes, substitutions and alterations can be made without departing from the spirit and scope of the invention.

We claim:

1. An arrayed waveguide grating (AWG) disposed on a substrate, comprising:

an input slab with a plurality of inputs and a plurality of outputs;

an output slab with a plurality of inputs and a plurality of outputs;

at least one photodiode coupled to one output of the output slab; and a plurality of waveguides coupled between the input slab and the output slab, where each of the plurality of waveguides:

has a phase modulator in the optical path of a light signal, and has a predetermined optical path length difference with respect to an adjacent waveguide, and where each phase modulator has an input for receiving a control signal, and the phase modulator modifies the phase of the light signal propagating through it in response to the received control signal such that a light signal received by the at least one photodiode is optimized.

2. An AWG according to claim 1, and further comprising:

a controller with a first plurality of outputs, where each of the first plurality of outputs is coupled to the control signal input of a respective one of the plurality of phase modulators.

3. An AWG according to claim 2, and further comprising a memory system coupled to the controller.

4. An AWG according to claim 3, and further comprising:

at least one input to the controller, where the at least one photodetector has an optical input and an electrical output, the at least one photodetector generates an electrical signal at a respective output in response to detected light and the output of the at least one photodetectors is coupled to a respective input to the controller.

5. An AWG according to claim 4, wherein the AWG, the controller, the memory and the at least one photodetector are disposed on a substrate.

6. An AWG according to claim 4, and further comprising:

at least one temperature sensor, where the at least one temperature sensor has an output and the at least one temperature sensor is in substantial thermal proximity to the AWG, and at least a second input to the controller, where the at least a second input is coupled to the output of the at least one temperature sensors.

7. An AWG according to claim 6, and further comprising:

at least one heating element, where the at least one heating element has an input and the at least one heating element is in substantial thermal proximity to the AWG, and at least a second output from the controller, where the at least a second output is coupled to the input of the at least one heating element.

8. An AWG according to claim 7, wherein the AWG, the controller, the memory system, the at least one photodetector, the at least one temperature sensor and the at least one heating element are disposed on a substrate.

9. An AWG according to claim 1, wherein each of the plurality of waveguides has at least one curved section, where the at least one curved section is substantially identical to a curved section in an adjacent waveguide of the AWG.

10. An AWG according to claim 1, wherein the phase modulator is selected from one of the following: a transistor, a PIN diode and a resistor.

11. An AWG according to claim 1, wherein at least one of the plurality of waveguides is selected from a group comprising: a strip loaded waveguide, a channel waveguide, a rib waveguide and a ridge waveguide.

12. The arrayed waveguide grating according to claim 1, wherein said arrayed waveguide grating comprises a strip loaded waveguide comprising a strip, a slab and a low index transition layer between the strip and the slab.

13. An AWG according to claim 1, wherein the substrate is selected from the group comprising: silicon, silicon on insulator (SOI), silicon on sapphire (SOS), silicon on nothing (SON) and silicon on dielectric.

14. A system for phase error compensation of an AWG comprising:

a plurality of phase modulators, where each phase modulator has an input, a controller, where the controller has at least one input and a plurality of outputs, and each of the plurality of outputs is coupled to an input of a respective one of the plurality of phase modulators wherein the controller communicates a control signal to the respective phase modulator, and at least one photodetector, where each of the at least one photodetectors is optically coupled to a respective one of a plurality of outputs of the AWG for receiving a light signal, and each of the at least one photodetectors has an output coupled to a respective input of the controller wherein each of the plurality of phase modulators modifies the phase of light propagating through it in response to the received control signal such that a light signal received by the at least one photodiode is optimized.

15. A system for phase error compensation of an AWG comprising:

a plurality of phase modulators, where each phase modulator has an input and each phase modulator is in an optical path of a respective one of a plurality of arrayed waveguides of the AWG, and has a signal input;

a controller with at least one input and a plurality of outputs, a signal generator with an input and an output, a light source of a selected frequency, a modulator with an optical input, an optical output and a signal input, at least one photodetector with an optical input for receiving a light signal and an electrical output, and a signal detector with an input and an output, where:

an output of the controller is coupled to the input of the signal generator, the output of the signal generator is coupled to the signal input of the modulator, the input of the modulator is coupled to the light source, the output of the modulator is coupled to a selected one of a plurality of inputs to the AWG, the input of the at least one photodetector is coupled to a selected one of a plurality of outputs of the AWG, the output of the at least one photodetector is coupled to the input of the signal detector, the output of the signal detector is coupled to the at least one input of the controller, and an output of the controller is coupled to a respective one of the plurality of phase modulators, wherein each of the plurality of phase modulators modifies the phase of light propagating through it in response to the received control signal such that a light signal received by the at least one photodiode is optimized.

* * * * *